United States Patent [19]

Peairs et al.

[11] Patent Number: 5,694,228
[45] Date of Patent: Dec. 2, 1997

[54] DOCUMENT IMAGE PROCESSOR WITH DEFECT DETECTION

[75] Inventors: Mark Peairs, Menlo Park; John Cullen; James Allen, both of Mountain View; David Stork, Stanford, all of Calif.

[73] Assignees: Ricoh Company,Ltd., Tokyo, Japan; Ricoh Corporation, Menlo Park, Calif.

[21] Appl. No.: 288,147

[22] Filed: Aug. 9, 1994

[51] Int. Cl.$^6$ .................................................. H04N 1/409
[52] U.S. Cl. ..................... 358/538; 358/448; 358/453; 382/172
[58] Field of Search ..................... 358/448, 518, 358/445, 447, 474, 452, 453, 538; 382/172, 168; 348/251, 246, 247

[56] References Cited

U.S. PATENT DOCUMENTS

| | | | |
|---|---|---|---|
| 4,298,895 | 11/1981 | Arai et al. | 358/284 |
| 4,473,845 | 9/1984 | Davy | 348/246 |
| 4,484,230 | 11/1984 | Pugsley | 358/284 |
| 4,866,785 | 9/1989 | Shibano | 382/302 |
| 4,958,373 | 9/1990 | Usami et al. | 382/141 |
| 4,975,972 | 12/1990 | Bose et al. | 382/172 |
| 5,047,863 | 9/1991 | Pape et al. | 348/247 |
| 5,201,014 | 4/1993 | Degi et al. | 382/172 |
| 5,214,470 | 5/1993 | Denber | 355/75 |
| 5,365,310 | 11/1994 | Jenkins et al. | 355/202 |
| 5,381,175 | 1/1995 | Sudo et al. | 348/246 |

Primary Examiner—Kim Vu
Assistant Examiner—Tia M. Harris
Attorney, Agent, or Firm—Philip H. Albert; Townsend and Townsend and Crew LLP

[57] ABSTRACT

Automatic detection of defective pixel locations from digital images of scanned documents is provided. A list of tentative defect locations is kept, and as each document is scanned, entries are added to the list. As subsequent documents occur with the same color pixel in the same location, a count for that tentative defect location is incremented, but if the color of the pixel in that location changes, the count is reduced or zeroed. If a count for a location is incremented above a threshold, the tentative defect is flagged as an actual defect and a defect detector outputs or flags that pixel location as being an actual defect location. If memory size is constrained, the number of entries in the defect list is capped at some maximum size and a tentative defect location is added to the list only if an entry is available. To avoid the bias of the defect list being filled with pixel locations from only the first portion of documents scanned if the maximum number of entries is much less than the number of tentative defect locations, cursors changeably identify preferred regions of a document and tentative defects are only accepted for placement on the defect list from the preferred region.

22 Claims, 8 Drawing Sheets

DOCUMENT IMAGE PROCESSOR WITH DEFECT DETECTION

BACKGROUND OF THE INVENTION

The present invention relates generally to the field of digital image processing, and more specifically to the problem of identifying pixel locations with questionable pixel color values which are questionable due to defects in a scanner.

A document is digitized by dividing an image of the document into pixel locations and assigning a pixel color to each pixel location, where the assigned pixel color corresponds to a color of an area around the pixel location on the document being digitized. Typically, the digitizer divides all documents into the same pixel locations, for example, a 300 DPI (dots per inch) digitizer will divide 8½x·11" documents into the same 2550 by 3300 pixel locations every time. In some applications, digitizing also includes the process of recognizing patterns of the pixels, such as done in character recognition applications. However, the digitization process of interest herein is just the process of obtaining a pixel array which forms a digital image representative of the document being scanned/digitized.

Defects in the scanning mechanism of a digital copier or computer scanner can introduce errors in the digital images produced by such mechanisms. For example, if the glass platen of a copier is scratched deeply enough that dirt accumulates in the scratch or the scratch affects the refraction of light through the glass, the scratch might appear as a dark line added to the digital image. If the pixel locations associated with these defects can be determined, image restoration techniques can be used to correct the errors by adjusting the pixel color values of pixels at those pixel locations which are flagged as defect locations. Note that a pixel at a defect location need not have an erroneous color value, just a questionable value due to the defect at that location.

A particularly good system for restoration of digital images containing defects at known locations is disclosed in U.S. patent application Ser. No. 08/045,954, filed Apr. 12, 1993, which is assigned to the assignees of the present application and is entitled "Restoration of Images with Undefined Pixel Values."

U.S. Pat. No. 5,214,470, issued to Denber on May 25, 1993, describes a method for isolating defects in which a blank sheet of paper is placed on the scanning platen and the locations of pixels with dark color values in the resulting digital image of the blank sheet are flagged as defect locations. This method is particularly inconvenient and requires the manual intervention of the user. In addition to this method being inconvenient, it may also result in the overinclusion and underinclusion of defect locations in a defect listing.

Overinclusion of defects occurs when there is dirt or dark smudge on the blank sheet, which is then interpreted to be a defect in the scanner itself. Underinclusion occurs where a white defect is present on the scanning platen, such as would be caused by spilled correction fluid adhering to the platen, since white defects cannot be detected from a scan of a white sheet of paper.

Other defect correction mechanisms include manual entry of defect locations, which is even more cumbersome and often must be completed before documents are scanned. Another cumbersome defect correcting process uses image retouching software to allow a user to "brush" away defects in a digital image.

From the above it is seen that an improved system for automatically detecting defect locations in a digital image is needed.

SUMMARY OF THE INVENTION

The present invention solves the aforementioned difficulties with defect detection in scanned digital images. In one embodiment, the invention provides for automatic detection of defect pixel locations from the digital images of an accumulation of documents scanned using the scanner for which defects are to be detected. More specifically, a list of tentative defect locations is kept, and as each document is scanned, entries are added to the list. If only darkening defects are of concern, only the locations of dark pixels are noted in the list. If a subsequent document contains a dark pixel in a tentative defect location present in the list, a count for that tentative defect location is incremented, but if the location contains a light pixel, the count is reduced or the entry for that location is eliminated altogether. If a count for a location is incremented above a threshold, the tentative defect is flagged as a defect and a defect detector records or flags that pixel location as being an actual defect location.

In some variations of the invention, lightening defects are tracked as well as darkening defects. In the specific case of black and white bi-level digitization, a darkening defect always (or in the presence of quantization and alignment noise, almost always) produces a black pixel at the defect location regardless of the color of the document at that location. Similarly, a lightening defect produces a white pixel regardless of the document. The invention also works in the more general case, where pixel colors are any two colors, or where pixel colors are selected from many colors and/or shades of gray. For explanation purposes, pixel colors are often generally referred to as dark and light.

In some embodiments, a memory-saving technique is used to reduce the size of the defect list. Instead of having an entry in the defect list for each tentative defect location of a digital image, the number of entries in the defect list is capped at a specified maximum size and a tentative defect location is added to the list only if an entry is available. To avoid the bias of the defect list being filled with pixel locations from only the first portion of documents scanned, not all defects are put on the list right away. Cursors stored in cursor registers define a rolling window covering less than all the possible defect locations. If a defect is detected, but is not within the rolling window, it is not put on the defect list. However, since the rolling window moves each time a document is scanned, eventually covering the entire document space, a defect will eventually be a candidate for addition to the defect list.

One additional advantage over the prior art of manually scanning a white piece of paper is that intermittent errors can also be detected, with proper adjustment of the thresholds. For example, if a CCD array contains an element which reports, over a series of scans, either a black pixel or a white pixel at random with equal probability, the present invention will detect it, while the prior art only has a fifty percent chance of detecting it, i.e., the black pixel must appear when the white paper is being scanned.

In an alternate method which detects both white and black errors, each page image, or frame, is accumulated until an error map evolves from the accumulation of many images. Because most images for which a copier or scanner are used are mostly white pixels, the page frames are very compressible. For detecting black error pixels, the frames can be made even more compressible by passing sets of frames through a threshold detector and changing to white the pixels that don't meet the threshold.

A further understanding of the nature and advantages of the inventions herein may be realized by reference to the remaining portions of the specification and the attached drawings.

DESCRIPTION OF THE PREFERRED EMBODIMENT

Figure 1:
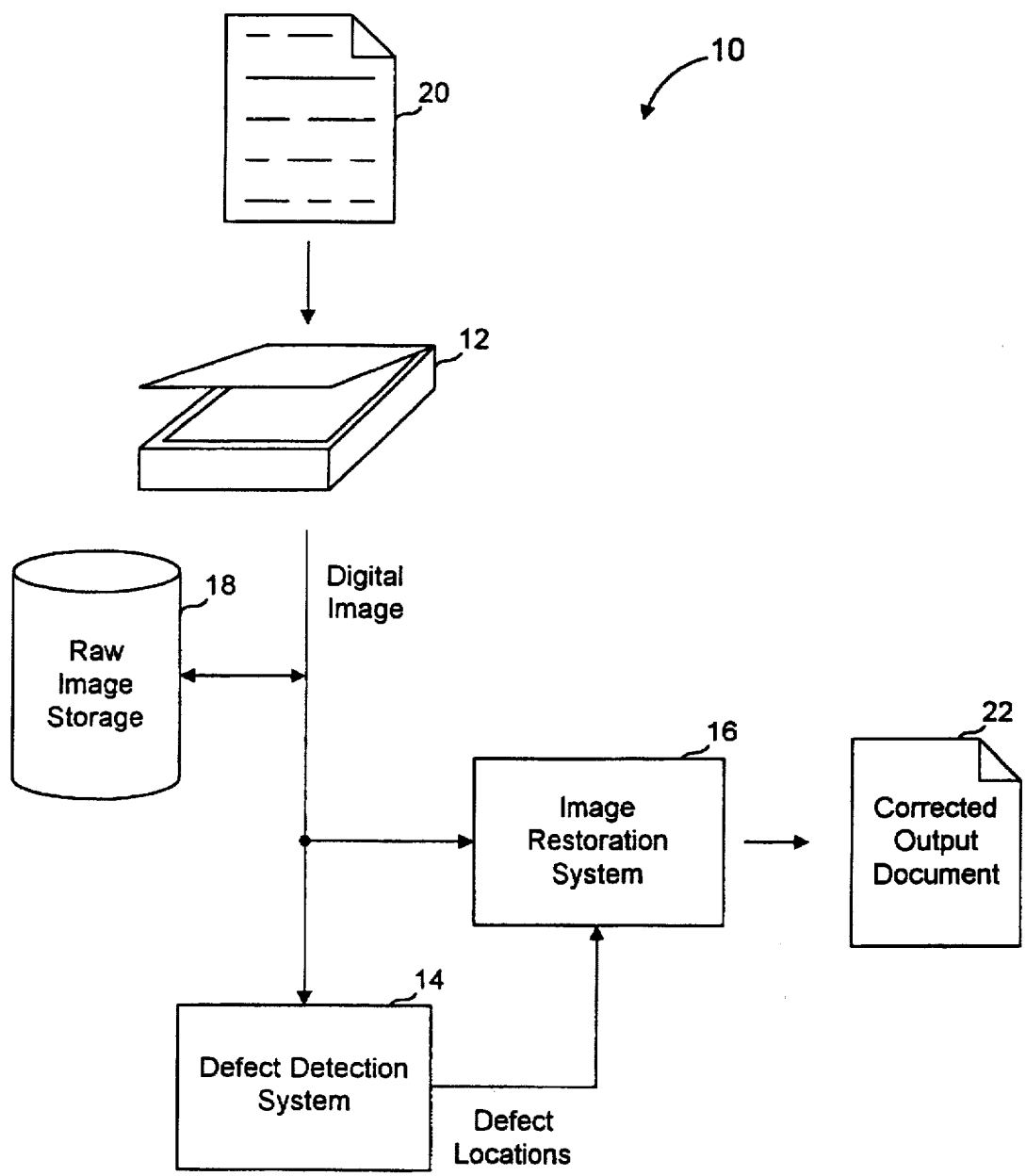
FIG. 1 is a block diagram of a document digitizing system using a defect defection system according to the present invention.

FIG. 1 is a block diagram of a digital document imaging system 10 with defect correction according to the present invention. System 10 includes a scanner 12, a defect detection system 14, an image restoration system 16, and optionally, raw image storage 18. The output from scanner 12 is a digital image which is supplied to defect detection system 14, image restoration system 16 and, if used, storage 18. The digital image is a digitized input image. The corrected output document image, or images, 22 is supplied by image restoration system 16. Defect detection system 14 is coupled to image restoration system 16 to provide defect locations.

In operation, defect detection system 14 will typically have accumulated knowledge of the defects present in the scanning mechanism of scanner 12. Of course, upon first use after reset, reconfiguration or initialization, defect detection system 14 will not know the location of defects, but must accumulate this knowledge over several documents.

Assuming defect detection system 14 has been operating long enough to accumulate knowledge of the defect locations in the scanner 12, document 20 is scanned by the scanning mechanism of scanner 12, which supplies the digital image of document 20 to defect detection system 14 and either storage 18 or image restoration system 16. Defect detection system 14 accumulates and refines knowledge about defect locations based on the digital images it receives. Image restoration system 16 uses this information about the defect locations to automatically retouch the digital image provided from scanner 12 and supply the corrected document image as image 22. Image 22, in some embodiments, is an electronically transmitted sequence of digital data, while in other embodiments, image 22 is translated into a printed document 22. The former embodiments are useful in computer applications, while the latter application is useful in office copier applications where a corrected copy of an original document is the desired output.

Figure 2:
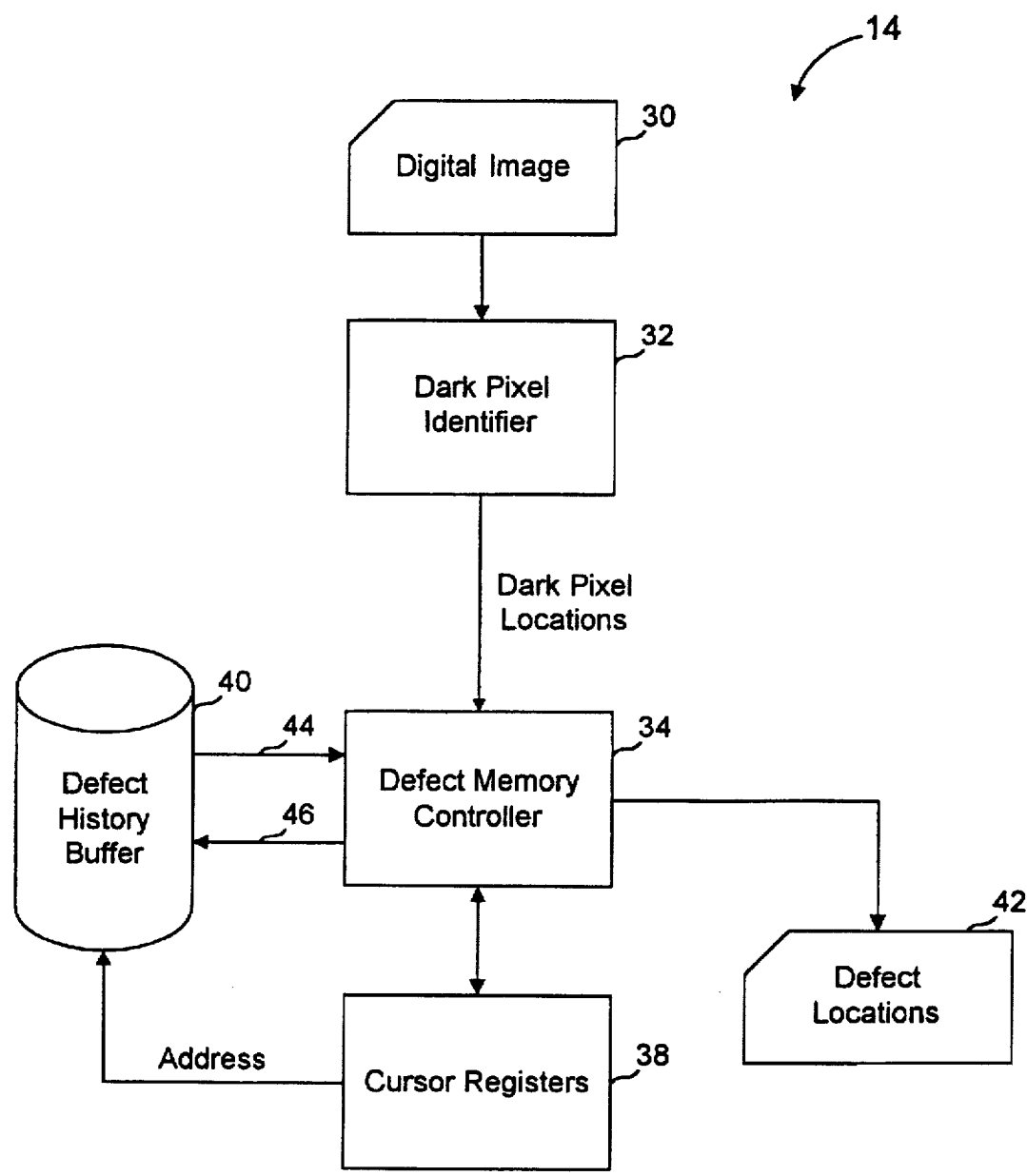
FIG. 2 is a block diagram further detailing the defect detection system shown in FIG. 1.

FIG. 2 is a block diagram showing defect detection system 14 in further detail. FIG. 2 shows a digital image 30, a dark pixel identifier 32, a defect memory controller 34, cursor registers 38, defect history buffer 40 and an output block of defect locations 42. FIG. 2 also shows the interconnections among the various blocks, such as an input of pixel identifier 32 coupled to receive digital image 30 and an output to provide dark pixel locations to controller 34. Controller 34 reads, modifies and deletes entries from defect history buffer 40 and reads cursor registers 38. Controller 34 also outputs block 42. Controller 34 and buffer 40 are shown coupled through two unidirectional data paths 44, 46, to highlight the interaction of controller 34 and buffer 40 which results in efficient packing of buffer 40. This is explained below in connection with FIGS. 6 and 7.

In general, the operation of defect detection system 14 is as follows. Dark pixel identifier 32 identifies all the dark pixels in digital image 30 and passes their locations to controller 34. Buffer 40 contains a list of all tentatively defective pixel locations. An entry in the defect list includes an identification of the location of the defect and thus a tentatively defective pixel in a specific image such as digital image 30. An entry also includes a count of the number of consecutive dark pixels found at that location in a series of documents, and other flags and fields as explained below. Controller 34 increments the count for an entry if the pixel at that location is dark and zeroes the count if the pixel is light or removes the defect from list 40 entirely. In an alternate embodiment, the count is not zeroes upon the occurrence of a light pixel, but is only reduced. Table 1 shows the contents of a typical defect list.

TABLE 1

| Location | Count | Status Flags |
|---|---|---|
| $l_0$ | $c_0$ | $f_0$ |
| $l_1$ | $c_1$ | $f_1$ |
| $l_2$ | $c_2$ | $f_2$ |
| ... | ... | ... |

Location field values can be stored as scalar position values or as row/column coordinates. For particularly efficient memory usage, the location fields need contain only offsets relative to the location of a prior entry.

In a specific embodiment, buffer 40 holds a maximum of 60,000 tentative defect entries, and each entry is stored in 20 bits of memory. Of the 20 bits assigned to an entry, 15 bits are allocated for storage of the location offset and the other 5 bits are allocated for storage of a status field, from which the count and status flags can be derived. Table 2 shows the meaning of each of the 32 possible status field values.

Each time a document is scanned, the entries are passed from buffer 40 to controller 34 along data path 44, modified or deleted by controller 34, and passed back to buffer 40 along data path 46. This allows buffer 40 to remain packed even while entries are being deleted, as explained in connection with FIGS. 6 and 7. In some embodiments, the controller merely directs the transfer of data within buffer 40 without it actually moving it to controller 34.

TABLE 2

Meaning of Status Bit Values

| Status Value | Corresponding Bit Sequence | Meaning |
|---|---|---|
| 0 | 00000 | No defect |
| 1 | 00001 | Most recent pixel was dark |
| 2–24 | 00010–11000 | Indicates number of consecutive recent dark pixels |
| 25 | 11001 | Location is a defect |
| 26 | 11010 | Skip lines [two?] |
| 27 | 11011 | End of image |
| 28–31 | 11100–11111 | Reserved |

Status 0 is used for the first entry in the list, which is not really a defect but a placeholder so that a process calculating an absolute position of a defect entry from an offset always has a prior record from which to refer. If the status value is between 1 and 24, the status operates as the count. In this example, the defect threshold is 25 consecutive dark pixels, and a status value of 25 indicates that a tentative defect location is elevated to the status of an actual defect. In some embodiments, once a tentative defect is judged an actual defect, a subsequent light pixel will not serve to reduce the count for that location, and in other embodiments, a light pixel merely reduces the count and the location is reduced to a tentative location until the count again reaches 25, however in the embodiment described herein, the entry is removed once a light pixel occurs.

Status 26 is used to provide for offsets larger than $2^{15}$. A status 26 entry is placed between two defect entries which are offset by more than $2^{15}$ pixel positions. Thus, the offset between two pixels with a status 26 entry between them is the number of pixels in a line multiplied by the offset field of the status 26 entry added to the offset indicated in the latter defect entry.

A status 27 entry is used to indicate the end of the active entries. Inactive entries are present if less than 60,000 tentative or actual defects are being tracked.

If an entry with a value of 25 is encountered by controller 34, it outputs the entry as one defect location in block 42. Thus, defect detection system 14 accumulates defect information about digital images of documents by noting where dark pixels occur in each digital image and maintaining a list of those pixel locations which are dark in each of a consecutive series of 25 documents, and outputs those locations as-defect location block 42. The logic view of this process, and why it works is explained in connection with FIG. 3, which graphically depicts approximately how defect detection system 14 perceives and sums pixels to determine defects.

FIG. 3(a) shows how four documents 50a through 50d and the pixels thereof are summed to form a summation image 50s. Digital image 50s is shown in gray scale with the gray scale of each pixel approximately representing the same of black pixels found in that location over digital images 50A to 50d.

In FIG. 3(b), digital images 52a through 52d are similar to images 50a through 50d except that each of the images 52a through 52d contain a common defect resulting from a scratch on a scanning platen. When these images are summed to form digital image 52s, the accumulation of pixels from the scratch effectively forms a dark line against a gray background of the random accumulation of text and graphics from the various digital images. The gray contrasted with the black illustrates that the pixel locations shown as gray are being reset as the images change, but the black pixel locations are not.

FIG. 3(c) graphically depicts the expected results of accumulating many documents and digital images using the scanning mechanism with that scratch. Digital image 54 has a white margin area 56, a dark scratch 58, a gray image area 60 and white defect 62. Thus, as FIG. 3(c) makes apparent, the text and/or graphics from the documents themselves are lowered into the background noise, while scanner defects show up clearly. Defect detection system 14, as described above, only detects black defects, but the apparatus described in FIG. 9 (described below) handles both white and black defects.

Figure 5:
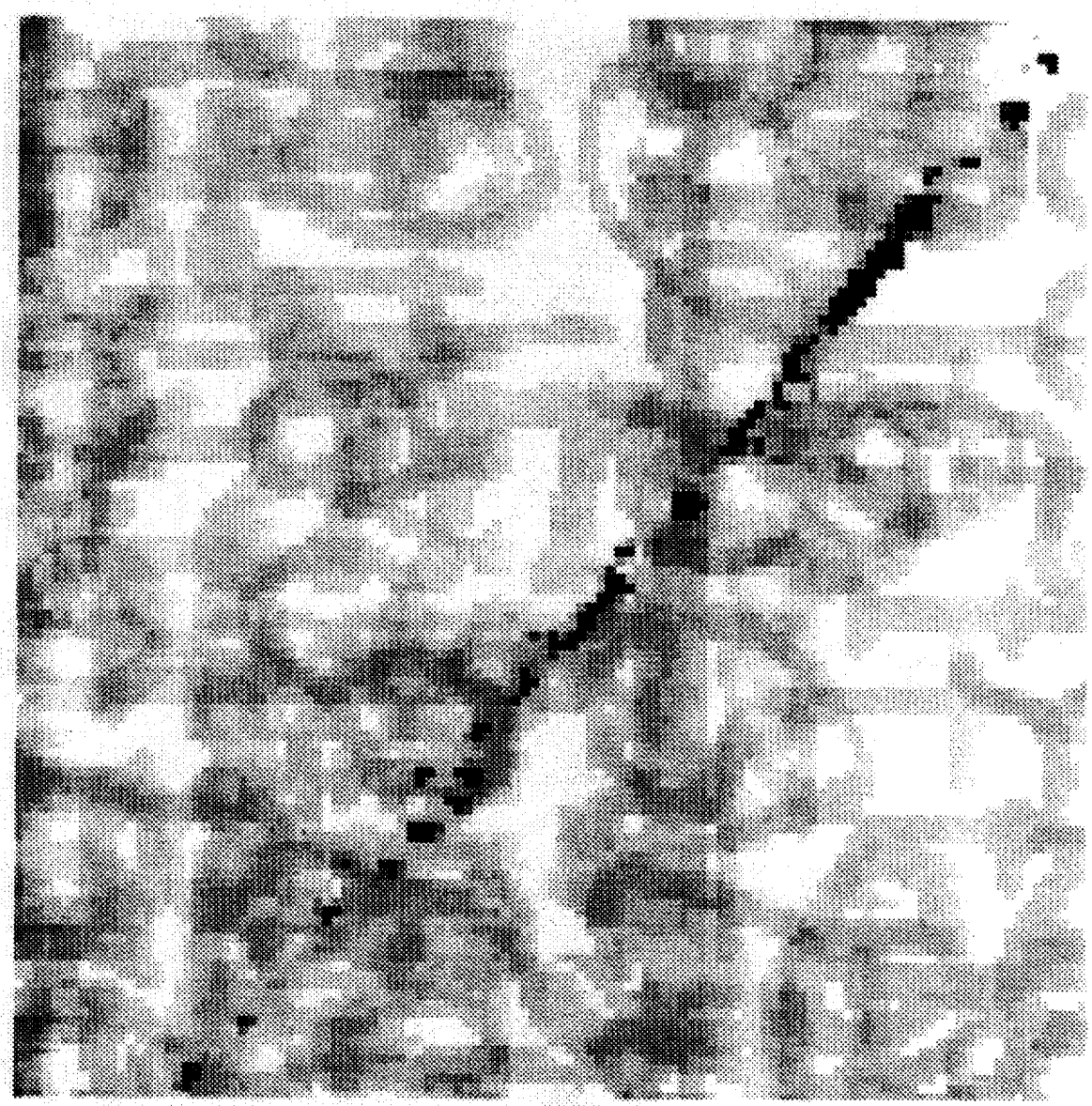
FIG. 5 illustrates the results of an actual defect detection experiment.

Write margin area 56 is expected where documents contain random text and graphics but all have the same margins. Thus, as FIG. 3(c) shows, it is a simple matter to apply a threshold between the gray of area 60 and the black of scratch 58 or the white of defect 62 to identify the pixels associated with scratch 58 or defect 62. An actual experimental result of summing documents with a defect in the scanning mechanism is shown in FIG. 5.

Figure 4:
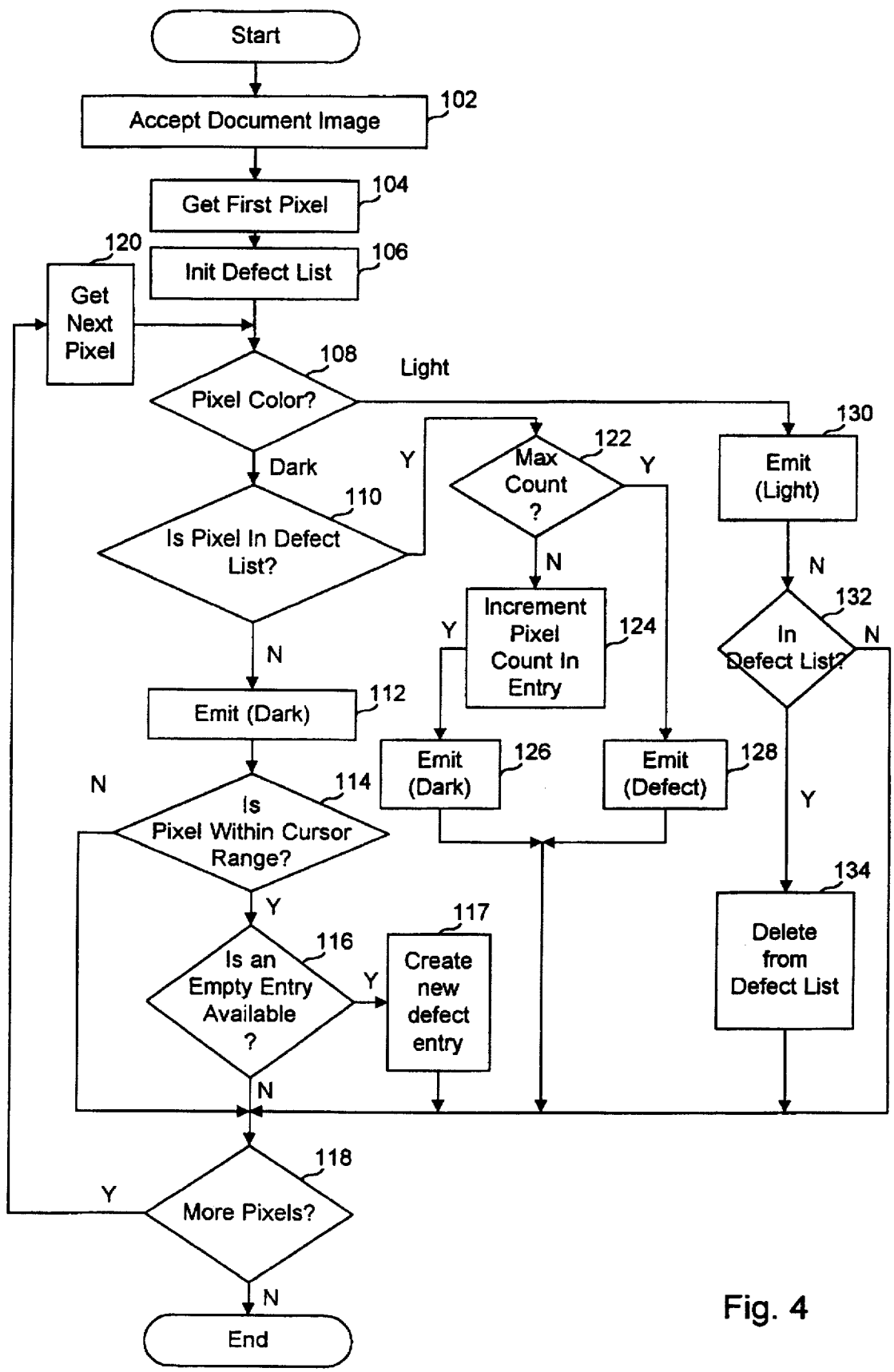
FIG. 4 is a flowchart of a defect detection process according to the present invention.

FIG. 4 is a flowchart of a method for identifying defective pixels. The process depicted in FIG. 4 flows from lower-numbered blocks to higher-numbered blocks except where otherwise indicated. This process is used to transform an input image containing pixels where each pixel is labelled only as a "black" pixel or a "white" pixel into an output image containing pixels labelled as "black", "white" and "defect" pixels. This process uses accumulations from previously scanned documents to determine defects and also incorporates information from the input image into the accumulation for use in subsequent defect detections.

At block 102, a document image is accepted. The form of a document image is generally a set of pixels, where each pixel has a location on the document and a color value, which in this case is either a value of light or dark. In a specific embodiment, light and dark correspond to white and black, respectively. Of course, the method described by FIG. 4 works equally well when the color values of light and dark are reversed, so long as the defect to be detected is the same color as the less common of the two possible colors.

At block 104, the first pixel of the input digital image is retrieved. Typically, the first pixel is the upper left pixel image and the next pixel is the pixel to the right of the first pixel, and the pixels proceed across the top row, followed by the left-most pixel in the second row from the top, continuing to the pixel in the lower right corner of the image.

At block 106, a defect list is initialized, if necessary.

At decision block 108, the pixel color of the first pixel is determined. In this decision block, the flow proceeds to block 130 if the pixel color is light, or to decision block 110 if the pixel color is dark.

At decision block 110, controller 34 checks to see if the pixel is in the defect list, or more precisely, if the pixel's location is in the defect list. If the location is not in the defect list, the process flows to block 112. Otherwise, it flows to block 122, the details of which are explained below.

At block 112, the pixel is emitted as a dark pixel. In other words, the pixel appears in the corrected output document 22 as a black pixel and the pixel's location is not output as a defect location 42 (see FIG. 2).

At decision block 114, controller 34 checks cursor registers 38 to see if the pixel is within the cursor range. If the pixel is within cursor range, then the process flows to decision block 116. Otherwise, the process flows to decision block 118.

In decision block 116, controller 34 checks to see if an empty defect entry is available in the defect list. If there is, the process flows to block 117, where a new defect entry is created in the defect list. Then the process flows to decision block 118. If an empty entry is not available, the process flows directly from block 116 to block 118.

At decision block 118, defect detection system 14 checks to see if any further pixels are available for processing. If not, the process terminates. If more pixels are available, the process flows to block 120, where the next pixel is retrieved and the flow continues with decision block 108.

The process flows from decision block 110 to block 122 if the pixel's location is in the defect list. At block 122, controller 34 checks to see if the maximum count of dark pixels has been reached for that pixel location. If not, the pixel count for that location is incremented at block 124, a dark pixel is emitted at block 126, and the process flows to block 118. Otherwise, if the maximum count has been reached, the process flows to block 128, where a defect pixel is emitted, and the process flows to block 118.

A defect pixel is emitted as the logical result of controller 34 placing that pixel's location at its output as one of defect locations 42. Defect locations 42 are output either as they occur or in a block to the process of apparatus accepting the output of this process.

If at block 108, the pixel color is found to be a light pixel, the process flows to block 130, where a light pixel is emitted. The process then flows to block 132.

At block 132, controller 34 checks if the position of the fight pixel is in the defect list. If it is not, the process flows to block 118, but if it is, the process flows to block 134 and then to block 118. At block 134, the entry for that fight pixel's location is deleted from the defect list.

In summary, the flowchart shown in FIG. 4 illustrate the process by which pixels of an input document are processed into an output document where the input document contains light and dark pixels, and the output document contains light and dark pixels, as well as pixels which are marked as defective. Although the defective pixels might be separable into defective dark and defective light pixels, generally image restoration system 16 is able to operate to correct a defective pixel without knowing its color. Of course, if only continuously black pixels are flagged as defects, defect pixels will always have the same color, namely black. As FIG. 4 shows, the input document is also used to effect how later documents are processed.

FIG. 5 is an actual display of an accumulation of documents scanned using a defective scanning mechanism. Each pixel in FIG. 5 has a gray level corresponding to the number of documents in the accumulation which have a black pixel in that location. Most of the documents contained an artifact of a scratch on the scanner platen, which is clearly distinguishable from the text of the documents as a dark, diagonal line. Of course, the contrast represented in the defect list is even greater than that shown in FIG. 5, because, while the black pixels in FIG. 5 would have corresponding entries in the defect list with high counts, many of the gray pixels in FIG. 5 would have been deleted from the defect list, when the documents failed to have black pixels on consecutive documents.

Figure 6:
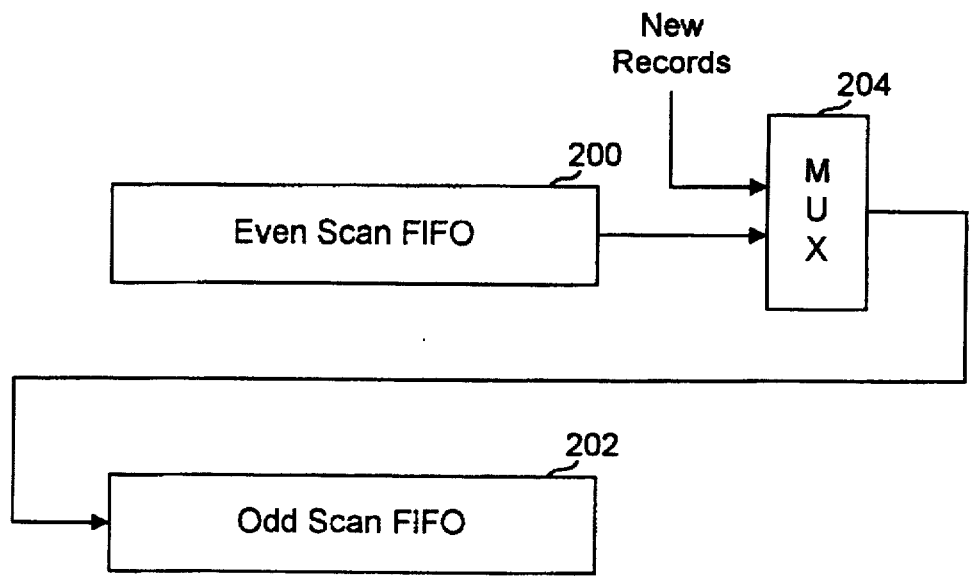
FIG. 6 is a block diagram of an inefficient use of FIFOs.

FIG. 6 shows how scanned lists such as might be used for the defect list are typically updated. FIG. 6 shows an even scanned FIFO (FIFO: First In, First Out Register), an odd scanned FIFO 202, and a multiplexer 204. The wiring in FIG. 6 is illustrated for an even scan. As the name suggests, the role of the FIFO's switch each scan. During an even scan, list elements are read from even FIFO 200 and written to odd FIFO 202, and during the following odd scan, list elements are read from odd FIFO 202 and written to even FIFO 200. The list elements are read out of one FIFO in order and written to the other FIFO, also in order, with some records deleted from the stream and new records interspersed in the stream by multiplexer 204. The effect of this is that the list is always in order and packed into one or the other FIFO. This effect could be had with only a single FIFO, but only if the space freed by deleted entries was completely necessary and sufficient for new records. Since this is generally never possible, two FIFO's are used.

Figure 7:
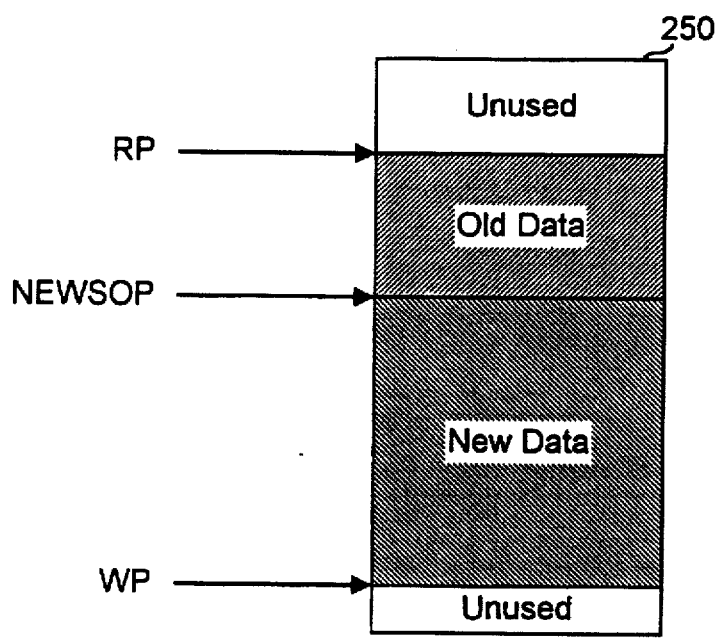
FIG. 7 is a memory map of a circular stack for storing a defect list.

FIG. 7 shows a more efficient use of memory to accomplish the same effect, namely to add, delete, and pack entries in a list in a single pass through the list. FIG. 7 shows memory array 250, such as might be maintained within buffer 40 (see FIG. 2). This memory array 250 is pointed to by three pointers stored in cursor registers 38. These three pointers are a read pointer (RP), a start of new list pointer (NEWSOP), and a right pointer (WP). The elements of array 250 between RP and NEWSOP and the new list is between NEWSOP and WP. The pointers are such that array 250 is a circular array, i.e., when a pointer is incremented past the bottom of array 250 it points to the first entry at the top of array 250.

During a scan, list entries are read from the array location pointed to by RP and an entry is written to the location pointed to by WP, then both RP and WP are incremented. Adding a new entry is effected by writing an entry to the entry pointed to by WP, but not incrementing RP. Deleting an entry is effected by incrementing RP without writing an entry to the entry pointed to by WP and not incrementing WP. In this way, the list always remains packed. When RP becomes equal to NEWSOP, that is a signal (sent to controller 34 in defect detection system 14) that the end of the list has been reached. At that point, no entries are read from the old data since there are no remaining entries to be read, and entries are only added, until the end of a scanned image is reached. This allows for a packed list to be maintained in half the space as that shown in FIG. 6.

Figure 3:
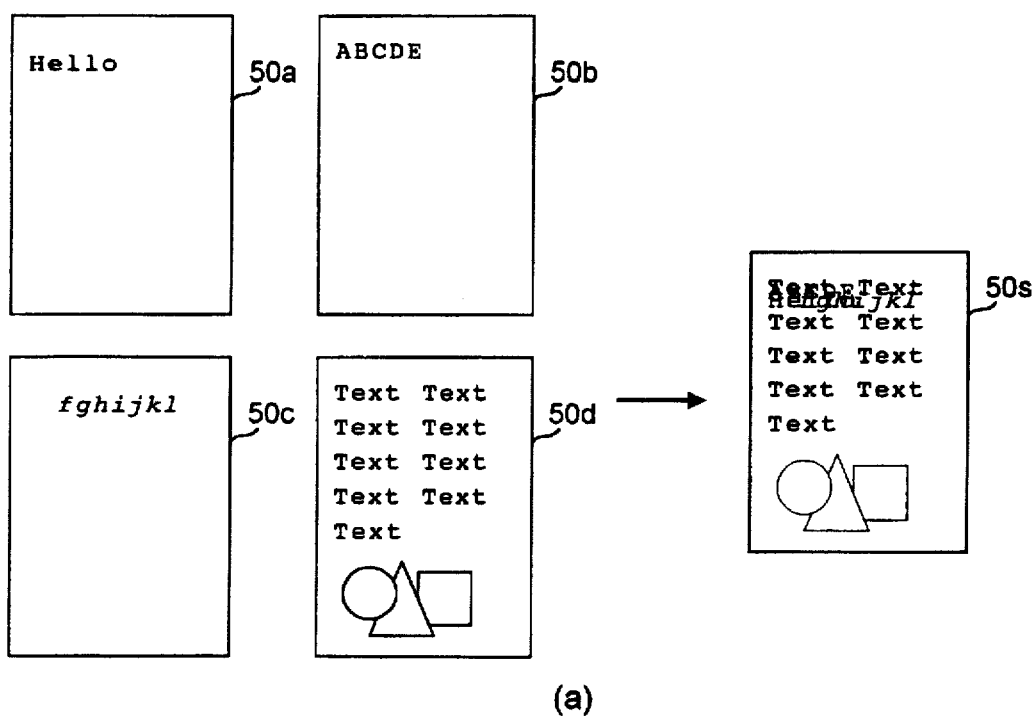
FIGS. 3(a)-(c) graphically depict a defect detection process.
Figure 3:
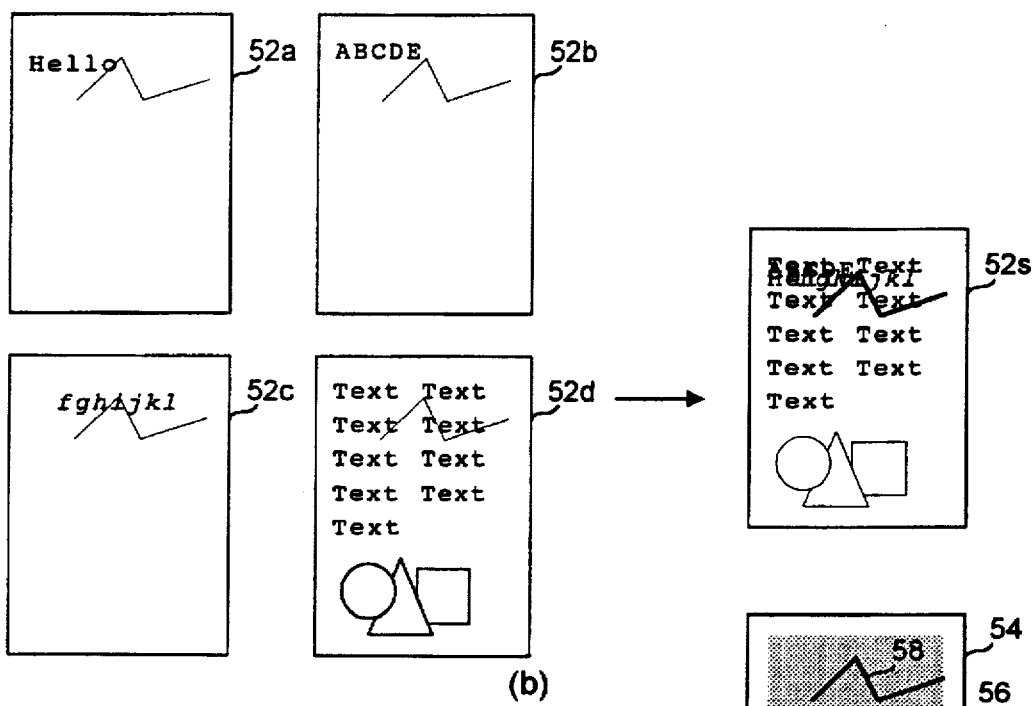
Figure 3:
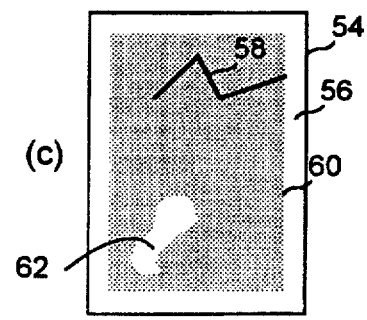

FIG. 3 and its accompanying description presented the concept of a gray scale map for defect detection. The method described in FIG. 4 achieves this using very little memory, but only detects dark pixels (or more generally, the defects which are the same color as the less common pixel color). Using a frame buffer to accumulate the abnormal runs of both black and white pixels, both colors of defects can be detected. Of course, storage of a frame buffer requires considerable memory. For example, even personal computers today have screen resolutions on the order of 1,000 rows by 1,000 columns, or a million pixels. Thus, for each page to be scanned, another million pixels worth of data needs to be accumulated. This results in an enormous number of pixels when even a small number of pages is scanned. Because many bits are typically required for each pixel, the amount of memory required in such a system can become enormous quickly.

In a frame buffer embodiment of this invention, the need for such an enormous frame buffer is avoided by performing the accumulation of document frames in stages and compression of the frame buffer. Because of the way the frame buffers are accumulated, large compression ratios are easily achieved. This is illustrated by FIGS. 8 and 9.

Figure 8:
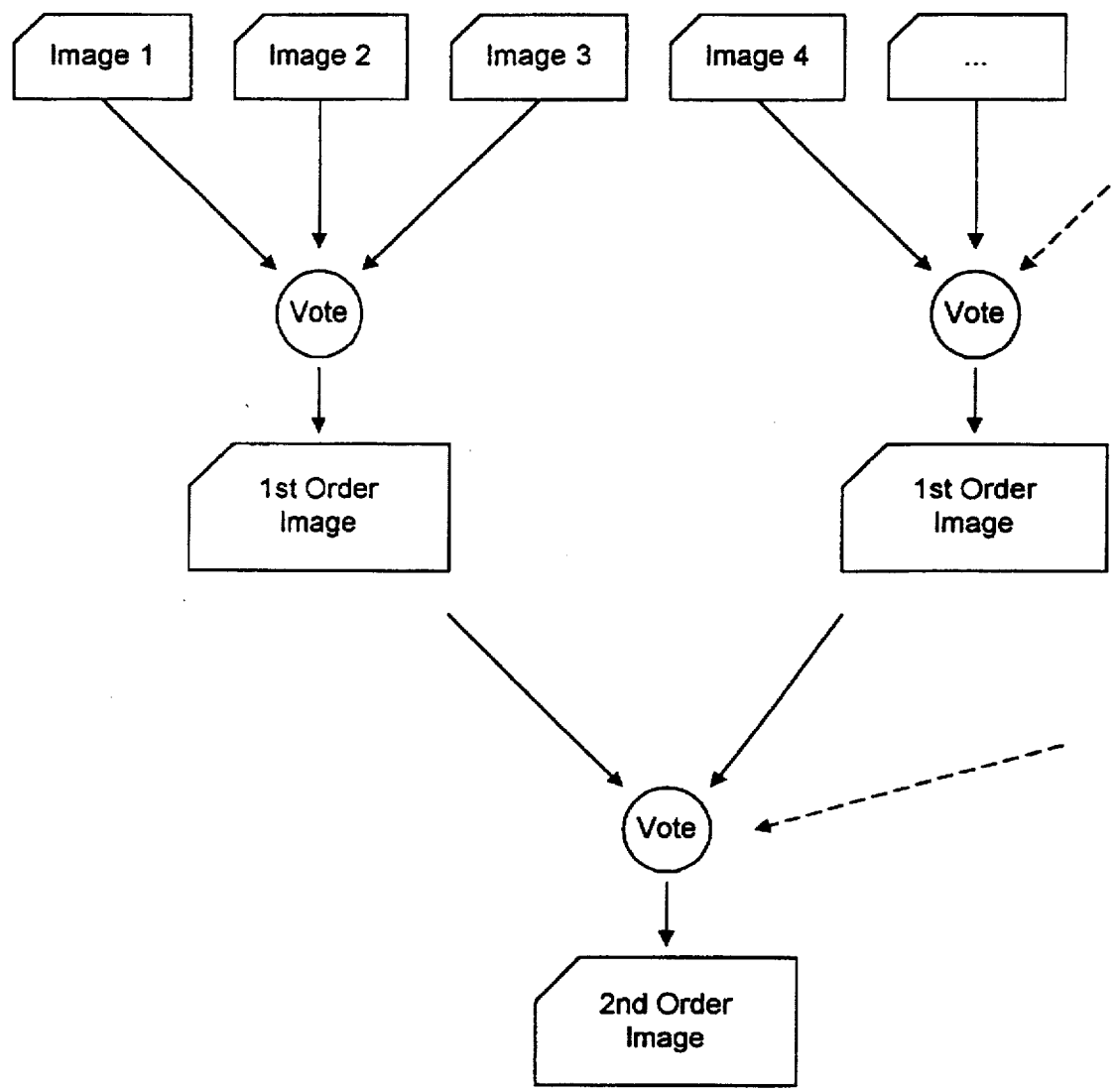
FIG. 8 is a diagram illustrating an alternate method for detecting defects based on a collection of document images.

FIG. 8 shows the process of accumulating document frames for detecting dark errors, where dark pixels are expected to be a minority of the pixels in an frame. As each document frame is received, it is stored until three frames are available. These three frames are combined by a voting method to create a first order frame combination. The voting method creates a first order frame wherein the color of each pixel in the first order frame is determined by pixels in corresponding locations in the three received frames, the pixel being dark if two or three of the corresponding pixels are dark, otherwise the pixel is light. Of course, other numbers of frames can be used and other voting thresholds can be used.

The first order frame is stored, and when three first order frames are available, they are similarly combined into a second order frame. It should be apparent that the number of dark pixels in a frame goes down as the order of the frames goes up, when there are fewer dark pixels than light pixels in the frames. Thus, with compression, less memory is required to store higher order frames, and the stored frames and higher order frames can be stored in a fraction of the space required by even a binary frame buffer, particularly if a compression technique such as LZW is employed.

Figure 9:
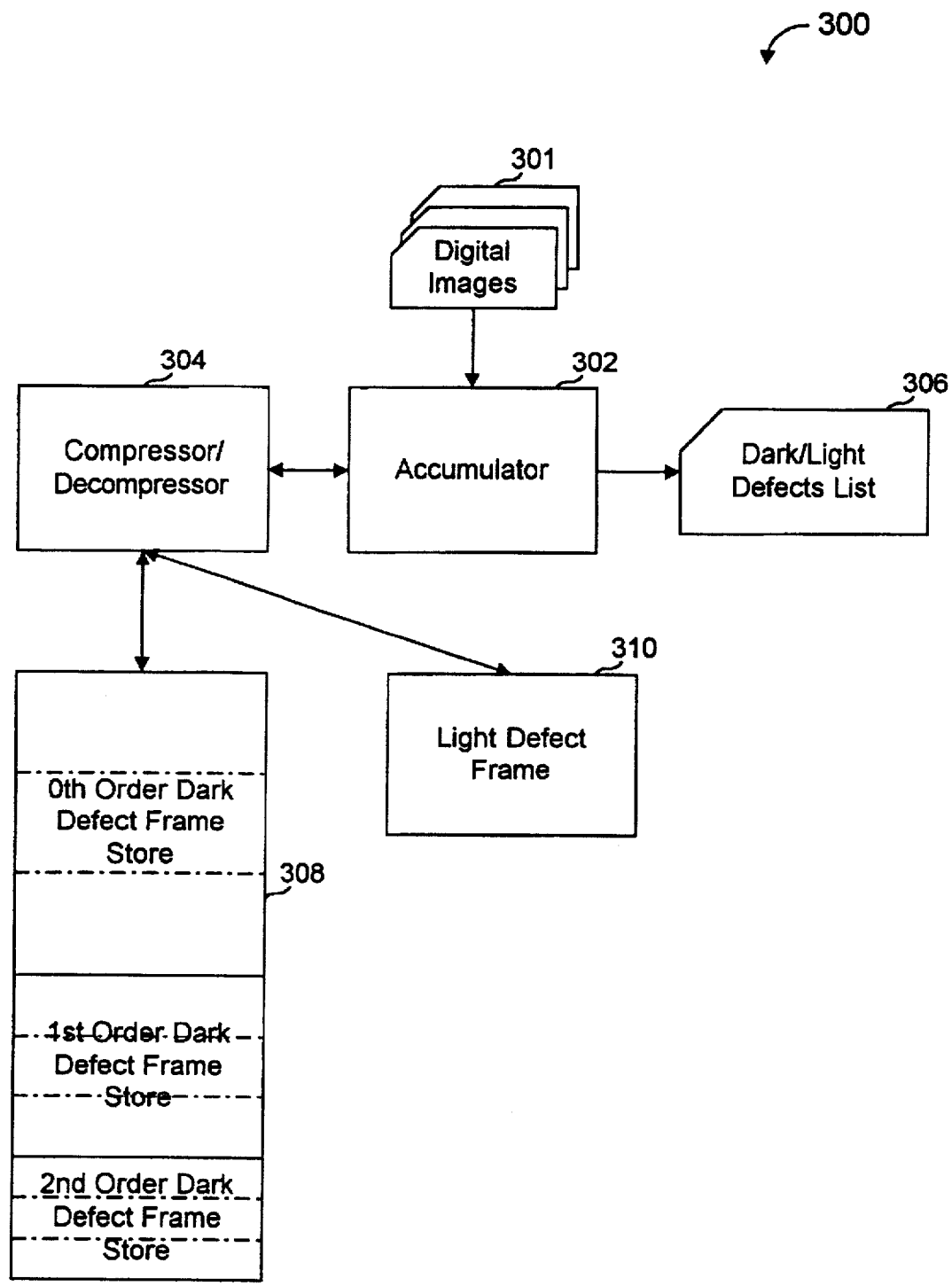
FIG. 9 is a block diagram of a page frame apparatus for detecting both white and black defects automatically.

FIG. 9 is a block diagram of an apparatus designed to accumulate these frames. Accumulator system 300 accepts digital frames 301 and outputs a defect list 306 which indicates both light and dark defects. System 300 includes an accumulator 302, a compressor 304, dark defect frame storage 308, and light defect frame storage 310. It should be understood that the roles of dark and light pixels are reversed in the figure as dark pixels are more prevalent in the frames than white pixels.

Accumulator 302 is coupled to compressor 304, and compressor 304 is coupled to dark defect frame storage 308, and light defect frame storage 310. In operation, accumulator 302 accepts frames, requests stored frames from compressor 304, and sends frames to compressor 304 for storage in one of the storage areas. When compressor 304 is retrieving a frame it acts as a decompressor, and when storing it acts as a compressor. This way, accumulator 302 deals with uncompressed frames while the frames are always stored in compressed form. Compressor 304 decompresses dark defect frames from, and compresses the frames to, storage 308, and also decompresses light defect frames from, and compresses the frames to, storage 310.

In the preferred embodiment, the accumulation and compression/decompression is done on a row-by-row basis with the current frame and the stored frames, by decompressing, adding, and recompressing scan lines separately, so that memory need not be allocated for an entire uncompressed frame. The number of orders of frames stored is variable depending on application requirements, although FIG. 9 shows three orders of documents. Once a number of documents have been scanned and a sufficiently high order frame is created, that frame is output as the defect list.

Using this method, the contents of the documents quickly fades from the higher order frames, leaving only the added defects. For example, with frames being combined at each order in threes and the threshold being two out of three, 81 frames are combined to form a fourth order frame. For a pixel in a fourth order frame to be a dark pixel, dark pixels would have to have been present at that pixel's location in at least sixteen of the first order frames. Assuming there are no defects and the frames are independently populated with 10% dark pixels and 90% light pixels, the fourth order frame would contain less than one dark pixel for every $10^{14}$ pixels. Therefore, the dark pixels present in a fourth order frame can be assumed to be defects.

White defects can be detected even more simply. By logically "OR"ing all the images, white defects can be detected. The frame stored in light defect frame is initially an all white image. As each image is provided to accumulator 302, it is "OR"ed pixel-by-pixel with the light defect frame. As images are provided, the frame becomes increasingly populated with dark pixels, except where each image includes similar margins and where white defects exist. After a sufficient number of images have been processed by accumulator 302, in general, only white defects are left inside the margins. Accumulator 302 detects the white margins of the images by locating the largest rectangle whose perimeter comprises at least 99.9% dark pixels. Within this rectangle, white pixels are identified as defective, and are output as part of defect list 306.

The above description is illustrative and not restrictive. Many variations of the invention will become apparent to those of skill in the art upon review of this disclosure. For example, this invention could be implemented by dedicated hardware, a programmed digital computer, or both. The scope of the invention should, therefore, be determined not with reference to the above description, but instead should be determined with reference to the appended claims along with their full scope of equivalents.

We claim:

1. A method for automatically identifying a set of defect locations in a digital image where a defect location in the set results from a defect in a digitizing means used to generate the digital image from an image of a document, wherein the digital image comprises a plurality of pixel locations with a pixel color value for each pixel location, the method comprising the steps of:

scanning multiple documents to form a plurality of digital images;

assigning each pixel location of each digital image of the plurality of digital images a pixel color value, wherein a pixel is characterized by a location and a color;

accumulating, for each pixel location in a region of interest, a count of documents in which said each pixel location contains a pixel of a common color value; and adding pixel locations which have a count higher than a threshold to the set of defect locations.

2. The method of claim 1, further comprising the step of removing particular pixel locations from the set of defect locations when said particular pixel locations are associated with a pixel pattern known to be present on documents of said multiple documents scanned in said scanning step.

3. The method of claim 1, wherein the common color value is a color value associated with either the color black or the color white.

4. The method of claim 1, wherein the region of interest is an entire image.

5. The method of claim 1, wherein the region of interest is limited by an mount of memory available in said accumulating step.

6. The method of claim 1, wherein the region of interest is a column which varies over the possible pixel locations of a document.

7. The method of claim 1, wherein said accumulating step is only performed if pixel locations in consecutive documents have pixels of a common color value in a pixel location, and further comprising the step of removing pixel locations for which pixels in consecutive documents are of different colors.

8. A method for automatically identifying a set of defect locations in a digital image where a defect location in the set results from a defect in a digitizing means used to generate the digital image from an image of a document, wherein the digital image comprises a plurality of pixel locations with a pixel color value for each pixel location, the method comprising the steps of:

scanning multiple documents to form a plurality of digital images;

assigning each pixel location of each digital image of the plurality of digital images a pixel color value, wherein a pixel is characterized by a location and a color;

accumulating, for each pixel location in a region of interest, a count of documents in which said each pixel location contains a pixel of a common color value;

adding pixel locations which have a count higher than a threshold to the set of defect locations; and supplying a digital image with questionable pixel values so marked.

9. The method of claim 8, further comprising the step of restoring pixel values to pixel locations in the set using an image continuation process.

10. The method of claim 1, further comprising the steps of:

maintaining a list of tentative defect locations, wherein an entry in said list indicates a pixel color value and a count;

adding a pixel location to said list when said pixel color for said pixel location is a defect color;

incrementing said count for a defect location when said indicated pixel color and a pixel color for said defect location are the same color; and indicating a tentative defect location as being a defect location when a count for said tentative defect location is incremented above a threshold value.

11. The method of claim 10, further comprising the step of decreasing said count when said indicated pixel color and a pixel color for said location are not the same color.

12. The method of claim 11, wherein said step of decreasing decreases said count to zero.

13. The method of claim 10, further comprising the step of removing a tentative defect location from said list when said indicated pixel color and a pixel color for said defect location are not the same color.

14. The method of claim 10, wherein said list is limited to a fixed number of entries and a pixel location is only added to said list if an entry is available.

15. The method of claim 10, wherein a pixel location are only added to said list if said pixel location is within a cursor region.

16. The method of claim 15, wherein said cursor region is varied to cover different regions.

17. The method of claim 1, wherein the document comprises text and graphics.

18. The method of claim 1, wherein the defect is caused by either a defect in the digitizing means or a defect in a platen interposed between the digitizing means and the document being scanned and digitized.

19. A method for automatically identifying a set of defect locations in a digital image where a defect location in the set results from a defect in a digitizing means used to generate the digital image from an image of a document, wherein the digital image comprises a plurality of pixel locations with a pixel color value for each pixel location, the method comprising the steps of:

scanning multiple documents to form a plurality of digital images;

assigning each pixel location of each digital image of the plurality of digital images a pixel color value, wherein a pixel is characterized by a location and a color;

accumulating, for each pixel location in a region of interest, a count of documents in which said each pixel location contains a pixel of a common color value wherein said step of accumulating uses stored image frames of varying order to hold results of said step and further comprises the steps of:

(a) decompressing at least one stored image frame; combining an image to be accumulated with said at least one stored image frame to form a first order stored image frame;

(b) recompressing said first order image frame; combining said first order stored image frame with other first order stored image frames to form a second order image frame;

(c) if necessary, repeating said step of combining to form higher order frames; and (d) providing either a second order image frame or a higher order image frame as a defect list; and adding pixel locations which have a count higher than a threshold to the set of defect locations.

20. The method of claim 19, wherein said steps of decompressing, combining and recompressing are done one scan line at a time.

21. The method of claim 19, wherein said steps of decompressing, combining and recompressing are done for both light and dark pixels.

22. The method of claim 21, where said step of combining is a voting combination for a less common pixel color and an "OR"ing combination for a more common pixel color.

* * * * *